Sept. 27, 1932.   J. H. ROBERTS   1,879,909
HOE
Filed July 24, 1931
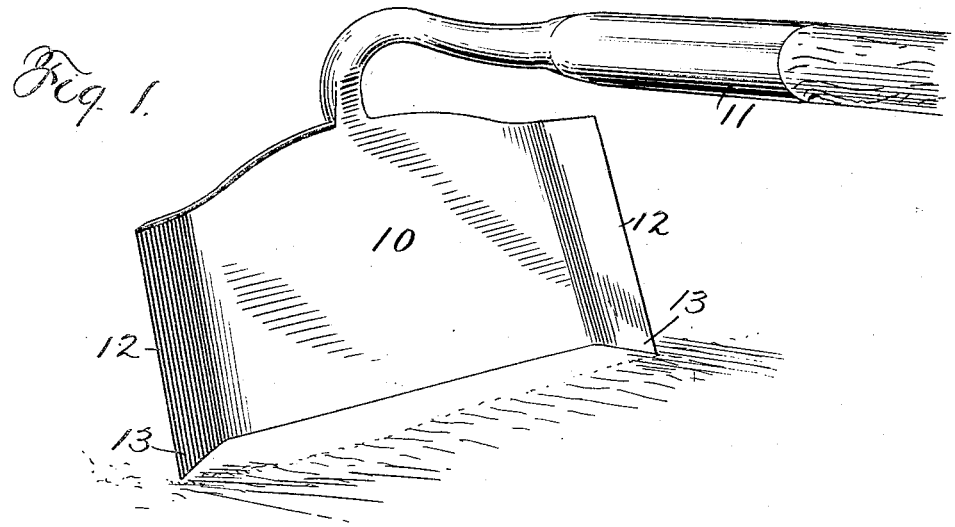
Fig. 1.
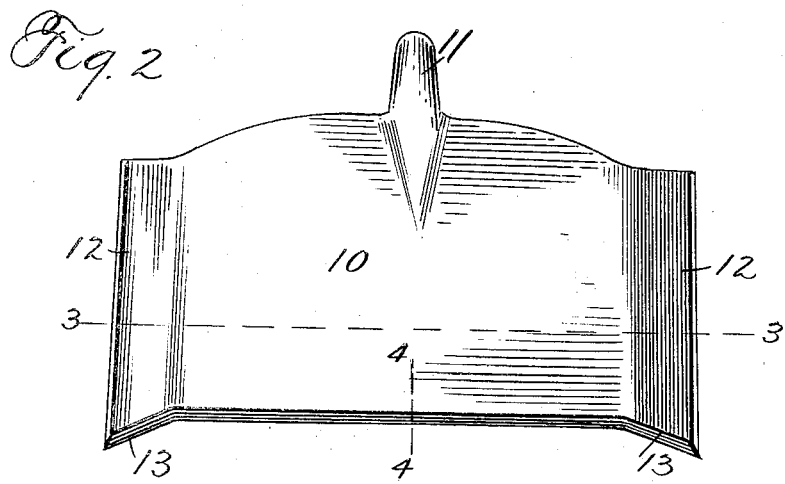
Fig. 2.
Fig. 3.
Fig. 4.
Inventor
John H. Roberts
By Chas. J. Williamson
Attorney Patented Sept. 27, 1932

1,879,909

UNITED STATES PATENT OFFICE

JOHN H. ROBERTS, OF NEWPORT, ARKANSAS

HOE

Application filed July 24, 1931. Serial No. 552,962.

My invention relates to hoes and particularly to hoes used in plant cultivation. The object of my invention is to provide a hoe which will have any or all of the advantages about to be named over hoes of customary construction, namely, no tendency to push away from the hoe weeds or vegetation to be cut, or dug, out of the ground, but on the contrary pulling or drawing thereof into contact with the hoe blade; efficient access of the blade to weeds or vegetation, growing near the plants requiring hoeing or cultivating; ease and certainty of chopping or cutting weeds or vegetation to be cut; prolonged use without dulling which necessitates sharpening; and more than one cutting edge and all cutting edges capable of high cutting efficiency.

My invention consists in whatever is described by or is included within the terms or scope of the appended claims.

In the drawing:—

Fig. 1 is a perspective view of a hoe embodying my invention shown in position for cutting with the bottom edge;

Fig. 2 is an elevation of the forward side of the blade;

Fig. 3 is a horizontal section on the line 3—3 of Fig. 2;

Fig. 4 is a vertical section on the line 4—4 of Fig. 2.

The hoe shown in the drawing has a blade construction which achieves the object of my invention in all respects, the construction shown being what I now regard as the most satisfactory embodiment of my invention. Of course, size or proportion is not an essential thing in my invention, nor is it necessary for a hoe, to be within the scope of my invention, to have all the characteristics of construction of the blade shown in the drawing.

Describing in detail what is shown in the drawing, the blade 10, has an upper edge convexly curved to which is rigidly secured a handle 11, of ordinary construction with the blade extending at an acute angle with the longitudinal axis of the handle.

Each vertical side edge, 12, of the blade extends at an obtuse angle from that face of the blade which is towards the handle, the intermediate portion of the blade being plane or flat with the result that said working face of the blade may be described as having a scoop form especially at the opposite vertical sides so that in engaging or striking weeds or objects in or on the ground, they will not only not be pushed or pressed away from and out of reach of the blade, but they will be drawn or pulled inward upon the working face of the blade.

Each vertical side edge of the blade is beveled to provide a cutting edge so that by using the hoe in a position with such edge downward, it can be used for cutting and its use for cutting is promoted or facilitated by the inclination of the edge portion of the hoe.

The bottom edge of the blade is also beveled to make such bottom edge a cutting edge, so that in fact, the blade provides three cutting edges.

At each corner of the bottom edge of the blade there is a pointed or angular tooth, 13, with a bottom cutting edge that extends downward and outward and coextensive with the bottom of the bent or inclined portion of the blade at the side. This form of tooth facilitates cutting contact of the hoe with weeds growing close to the plants requiring cultivation without danger of damage to the plants and the inclination of the bottom cutting edge of the tooth enables a shear cut to be made with the result that cutting can be easily done and prolongation of the period of sharpness of the cutting edge secured. Moreover, such inclination tends to draw objects engaged by such edge over or upon the working face of the hoe and without any tendency to push away therefrom.

The bottom edge of the blade between the two teeth at the corners is straight.

It will be evident that with the teeth located at the corners as shown when the bottom edge of the blade is sharpened, there is no danger of change of form nor diminution of the size of the corner teeth but so long as the hoe lasts, after repeated sharpening, form and size of the teeth and the bottom edge between the teeth remain unchanged.

The hoe shown in the drawing when used is held with the blade at an angle of about 100

45°, and the cutting edge engages the soil in a horizontal or substantially horizontal line.

Besides the advantages mentioned hereinbefore coming from the shape of the blade, my hoe is especially useful in hilling up plants or pulling dirt to the plants because the dirt tends to remain upon the working face of the hoe due to the confining action of the inclined side edges 12 of the blade, whereas with the ordinary plane or flat blade, the soil tends to spill out at the sides.

What I claim is:—

1. A hoe blade having edge portions inclined with reference to the working face of the blade in a direction to tend to carry engaged objects to such face the working face of the blade being flat between such edge portions and said edge portions being narrow compared with the area of the working face.

2. A hoe blade having edge portions inclined with reference to the working face of the blade in a direction to tend to carry engaged objects to such face the working face of the blade being flat between such edge portions and said edge portions being narrow compared with the area of the working face, such edge portions being at the vertical sides of the blade and reaching substantially from top to bottom of the blade.

3. A hoe blade having side and bottom edges and having at the corner where side and bottom edges adjoin a tooth with a bottom edge extending obliquely inward of the blade.

4. A hoe blade having side and bottom edges and having at the corner where side and bottom edges adjoin a tooth with a bottom edge extending obliquely inward of the blade, the vertical side of the blade being inclined towards the working face of the blade from top to bottom substantially coextensive with the bottom edge of said tooth the working face of the blade being flat.

5. A hoe blade having side and bottom edges and having at the corner where side and bottom edges adjoin a tooth with a bottom edge extending obliquely inward of the blade, the vertical side of the blade being inclined towards the working face of the blade from top to bottom substantially coextensive with the bottom edge of said tooth, the bottom edge of the blade and tooth being beveled to a cutting edge.

In testimony whereof I hereunto affix my signature.

JOHN H. ROBERTS.